United States Patent
Yu et al.

(10) Patent No.: US 11,966,233 B2
(45) Date of Patent: Apr. 23, 2024

(54) LINE LASER MODULE AND AUTONOMOUS MOBILE DEVICE

(71) Applicant: Beijing Roborock Technology Co., Ltd., Beijing (CN)

(72) Inventors: Guang Yu, Beijing (CN); Yongji Long, Beijing (CN); Dan Liu, Beijing (CN)

(73) Assignee: Beijing Roborock Technology Co., Ltd., Beijing (CN)

( * ) Notice: Subject to any disclaimer, the term of this patent is extended or adjusted under 35 U.S.C. 154(b) by 0 days.

(21) Appl. No.: 17/692,696

(22) Filed: Mar. 11, 2022

(65) Prior Publication Data
US 2022/0390947 A1    Dec. 8, 2022

(30) Foreign Application Priority Data

Jun. 2, 2021    (CN) .......................... 202110615607.0

(51) Int. Cl.
  G05D 1/02    (2020.01)
  G05D 1/00    (2006.01)
(52) U.S. Cl.
  CPC .......... *G05D 1/024* (2013.01); *G05D 1/0225* (2013.01); *G05D 1/0242* (2013.01); *G05D 1/0248* (2013.01); *G05D 2201/0203* (2013.01)
(58) Field of Classification Search
  CPC .... G05D 1/024; G05D 1/0225; G05D 1/0242; G05D 1/0248; G05D 2201/0203;
  (Continued)

(56) References Cited

U.S. PATENT DOCUMENTS

2006/0091297 A1*  5/2006  Anderson ............... G01S 17/08
                                                              250/221
2012/0081542 A1   4/2012  Suk et al.
(Continued)

FOREIGN PATENT DOCUMENTS

CN    108459596 A    8/2018
CN    210015368 U    2/2020
(Continued)

OTHER PUBLICATIONS

Machine Translation of CN-211012988-U (Year: 2020).*
(Continued)

*Primary Examiner* — Faris S Almatrahi
*Assistant Examiner* — Sahar Motazedi
(74) *Attorney, Agent, or Firm* — Thomas | Horstemeyer, LLP

(57) ABSTRACT

A line laser module, including: a module body; a first image capturing assembly, provided at the module body and comprising a first camera, at least one laser emitter and a first image processing module, wherein the at least one laser emitter is provided adjacent to the first camera and configured to emit a line laser with a linear projection toward outside of the module body, the first camera is configured to capture a first environment image containing the line laser, and the first image processing module is configured to acquire obstacle distance information based on the first environment image; and a second image capturing assembly, comprising a second camera and a second image processing module, wherein the second camera is configured to capture a second environment image, and the second image processing module is configured to acquire obstacle type information based on the second environment image.

15 Claims, 5 Drawing Sheets

(58) Field of Classification Search
CPC ......... Y02T 10/70; A47L 11/40; H04N 23/20; H04N 23/45; H04N 23/55; H04N 23/54
See application file for complete search history.

(56) References Cited

U.S. PATENT DOCUMENTS

| | | | |
|---|---|---|---|
| 2019/0293765 A1* | 9/2019 | Jeong | H04N 5/2354 |
| 2019/0306488 A1* | 10/2019 | Wang | H04N 13/257 |
| 2023/0185308 A1* | 6/2023 | Hwangbo | G01S 17/89 |
| | | | 701/25 |

FOREIGN PATENT DOCUMENTS

| | | | | | |
|---|---|---|---|---|---|
| CN | 211012988 U | * | 7/2020 | | |
| CN | 211012988 U | | 7/2020 | | |
| CN | 111505602 A | | 8/2020 | | |
| CN | 111571561 A | * | 8/2020 | ............. | B25J 5/007 |
| CN | 211508646 U | * | 9/2020 | | |
| CN | 212415596 U | | 1/2021 | | |
| CN | 212521620 U | | 2/2021 | | |
| CN | 212932957 U | * | 4/2021 | | |
| CN | 112864778 A | | 5/2021 | | |
| TW | 201144760 A | | 12/2011 | | |
| TW | 201937399 A | | 9/2019 | | |
| WO | WO-2017222558 A1 | * | 12/2017 | | |
| WO | 2021135392 A1 | | 7/2021 | | |
| WO | WO-2021135392 A1 | * | 7/2021 | ............. | A47L 1/02 |
| WO | WO-2022253119 A1 | * | 12/2022 | | |

OTHER PUBLICATIONS

Machine Translation of WO-2021135392-A1 (Year: 2021).*
Machine Translation of CN-211508646-U (Year: 2020).*
Machine Translation of CN111571561A (Year: 2020).*
Machine Translation of WO2022253119A1 (Year: 2022).*
Machine Translation of CN-212932957-U (Year: 2021).*
PCT, International Search Report for PCT/CN2022/077855, dated Apr. 28, 2022.
CN, Chinese First Office Action for Chinese Application No. 202110615607.0, dated Aug. 3, 2022.
Taiwanese Office Action dated May 4, 2023 in co-pending Taiwanese Patent Application No. 111120746.

* cited by examiner

LINE LASER MODULE AND AUTONOMOUS MOBILE DEVICE

CROSS REFERENCE TO RELATED APPLICATION

The present application claims the priority of the Chinese Patent Application No. 202110615607.0, field on Jun. 2, 2021. Priority to the preceding patent applications is expressly claimed, and the disclosures of the preceding applications are hereby incorporated herein by reference in their entireties and for all purposes.

TECHNICAL FIELD

Embodiments of the present disclosure relate to a line laser module and an autonomous mobile device.

BACKGROUND

An autonomous mobile device such as a cleaning robot can autonomously perform actions such as cleaning, mopping and vacuuming, and they have been widely used. During cleaning, the autonomous mobile device detects obstacles that may be encountered in a current working route in real time, and performs a corresponding obstacle avoidance. However, accuracy of obstacle identification by existing autonomous mobile devices is low, and it is difficult for the obstacles to be avoided accurately.

It should be noted that the information disclosed in the background art section above is only intended to enhance understanding of the background of the present disclosure, and therefore may include information that does not constitute the prior arts known to one of ordinary skill in the art.

SUMMARY

According to one aspect of the present disclosure, there is provided a line laser module, including:
- a module body;
- a first image capturing assembly, provided at the module body and including a first camera, at least one laser emitter and a first image processing module, wherein the at least one laser emitter are provided adjacent to the first camera and configured to emit a line laser with a linear projection toward outside of the module body, the first camera is configured to capture a first environment image containing the line laser, and the first image processing module is configured to acquire obstacle distance information based on the first environment image; and
- a second image capturing assembly, including a second camera and a second image processing module, wherein the second camera is configured to capture a second environment image, and the second image processing module is configured to acquire obstacle type information based on the second environment image.

In an embodiment of the present disclosure, the first image processing module acquires the obstacle distance information based on a triangulation.

In an embodiment of the present disclosure, the second image processing module includes:
- a feature extraction module, configured to perform a feature extraction on the second environment image to obtain feature information; and
- an identification module, configured to input the feature information into an obstacle identification model to identify the obstacle type information.

In an embodiment of the present disclosure, the second image processing module further includes:
- a training module, configured to generate the obstacle identification model using collected training data.

In an embodiment of the present disclosure, the laser emitter is configured to emit infrared light, the first camera is an infrared camera, and the second camera is an RGB camera.

In an embodiment of the present disclosure, the first image capturing assembly further includes:
- a first filter, provided at a side of the first camera away from the module body and configured to allow only the infrared light to enter the first camera; and the second image capturing assembly further includes:
- a second filter, provided at a side of the second camera away from the module body and configured to allow only the visible light to enter the second camera.

In an embodiment of the present disclosure, the module body includes a main body, a first end, and a connection part which is configured to connect the first end to the main body;
- one of the at least one laser emitter is provided at the first end; and
- the first camera and the second camera are provided at the main body.

In an embodiment of the present disclosure, the line laser module further includes:
- a positioning device for docking, provided at the module body and configured to communicate with a charging station.

In an embodiment of the present disclosure, the positioning device for docking includes an infrared emitter and at least two infrared receiving devices, wherein the infrared emitter is configured to send a first infrared signal to the charging station, and the at least two infrared receiving devices are configured to receive a second infrared signal from the charging station.

In an embodiment of the present disclosure, both the first image capturing assembly and the second image capturing assembly are connected with a primary control unit, which is configured to send operation instructions to the first image capturing assembly and the second image capturing assembly.

In an embodiment of the present disclosure, the laser emitter includes:
- a line laser generator, configured to generate line laser;
- a laser driving circuit, connected with the primary control unit, wherein the laser driving circuit controls the line laser emitter based on the operation instructions sent by the primary control unit.

In an embodiment of the present disclosure, the laser driving circuit includes:
- a first amplification circuit, configured to receive a control signal sent by the primary control unit, amplify the control signal and send an amplified control signal to the laser emitter, so as to control the laser emitter to turn on or turn off; and
- a second amplification circuit, configured to receive an adjustment signal sent by the primary control unit, amplify the adjustment signal and send an amplified adjustment signal to the laser emitter, so as to control emission power of the line laser emitter.

In an embodiment of the present disclosure, a first optical axis of the first camera is inclined downward with respect to a horizontal direction, and a second optical axis of the second camera is inclined upward with respect to the horizontal direction.

In an embodiment of the present disclosure, a first angle between the first optical axis of the first camera and the horizontal direction is 7 degrees, and a second angle between the second optical axis of the second camera and the horizontal direction is 5 degrees.

According to one aspect of the present disclosure, there is provided an autonomous mobile device, including:
a device body;
a line laser module according to any one of the above embodiments, provided on the device body; and
a device controller, configured to control movement of the autonomous mobile device based on the obstacle distance information and the obstacle type information.

In an embodiment of the present disclosure, the autonomous mobile device further includes:
a buffer component, provided at sides of the first image capturing assembly and the second image capturing assembly away from the module body, and having an opening opposite to the first image capturing assembly and the second image capturing assembly, respectively;
wherein the buffer components are provided with a supplement lamp located at periphery of the openings.

It is to be understood that both the foregoing general description and the following detailed description are exemplary and explanatory only and are not restrictive to the present disclosure.

BRIEF DESCRIPTION OF THE DRAWINGS

The drawings herein, which are incorporated and constitute a part of this specification, illustrate embodiments in consistent with the present disclosure, and serve to explain the principle of the present disclosure together with the specification. It should be noted that the figures are not necessarily drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure. The drawings in the following description are merely some embodiments of the present disclosure, and for one of ordinary skill in the art, other drawings may be obtained based on these drawings without creative efforts.

DETAILED DESCRIPTION OF THE PREFERRED EMBODIMENTS

Figure 1:
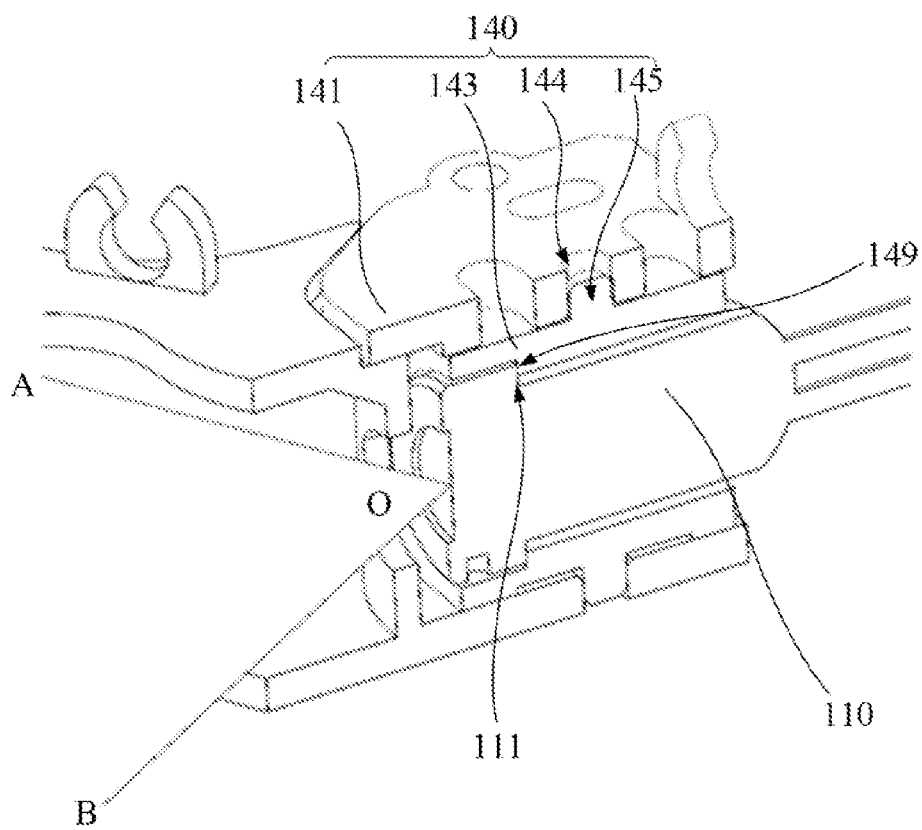
FIG. 1 illustrates a partial schematic structural view of a line laser module according to an embodiment of the present disclosure.

Exemplary embodiments of the present disclosure will be described more thoroughly with reference to the accompanying drawings. However, the exemplary embodiments can be implemented in various forms and should not be construed as a limit to the embodiments set forth herein. Rather, these embodiments are provided so that the present disclosure will be thorough and complete, and will fully convey the concept of the exemplary embodiments to one of ordinary skill in the art. The same reference numerals in the drawings denote the same or similar structures, and thus their detailed descriptions will be omitted. In addition, the drawings are merely schematic illustrations of the present disclosure and are not necessarily drawn to scale.

The terms "a", "an", "the", "said" and "at least one" are intended to indicate the presence of one or more elements or components etc. The terms "comprising" and "including" are intended to indicate non-exclusivity inclusive means, and mean that there may be additional elements or components, etc., in addition to the listed elements or components, etc., and the terms "first" and "second" are only used as markers, and not to limit the quantity of objects.

At least one embodiment of the present disclosure provides a line laser module, which is applicable to an autonomous mobile device. And at least one embodiment of the present disclosure provides an autonomous mobile device including the line laser module. In an embodiment of the present disclosure, the autonomous mobile device is an intelligent cleaning device, such as a cleaning robot, a mopping robot, a floor polishing robot or a lawn mower. For ease of description, an embodiment takes a cleaning robot is taken as an example in embodiments of the present disclosure to describe the technical solution of the present disclosure.

As illustrates in FIGS. 1-5, in an embodiment of the present disclosure, an autonomous mobile device includes: a device body 200, a sensing system, a device controller, a driving system, a cleaning system, a power system and a human-computer interaction system, etc. Each system cooperates with each other, so that the autonomous mobile device can move autonomously to perform cleaning. Respective systems of the autonomous mobile device are integrated in the device body 200.

The device body 200 may have an approximately circular shape (both the front part and the rear part are circular). And alternatively, the device body may have other shapes, including but not limited to an approximately D-shape with a front part of square and a rear part of circular. The sensing system includes a line laser module disposed on a top or at a lateral side of the device body 200. The device controller is connected to the line laser module and control the autonomous mobile device to perform a function according to a sensing result of the line laser module.

In an embodiment of the present disclosure, where the line laser module is disposed on the device body 200 is not defined. For example, the line laser module may be disposed at, but not limited to, a front side, a rear side, a left side, a right side, top, a middle or a bottom, etc. of the device body 200. Furthermore, the line laser module may be provided at a middle position, a top position or a bottom position in height direction of the device body 200.

In some embodiments of the present disclosure, the autonomous mobile device moves forward to perform a task. In order to better detect ambient information ahead, the line laser module is disposed on the front side of the device body 200, wherein the front side is a side that the device body 200 faces when the autonomous mobile device moves forward.

In some embodiments of the present disclosure, the autonomous mobile device further includes a charging station, wherein the charging station is suitable to be connected to or detached from the device body 200. For example, when the device body 200 is required to be charged, it is docked into the charging station for charging. When the device body 200 performs cleaning, it is detached from the charging station for cleaning operation. The charging station includes an infrared laser emitter configured to emit an infrared signal, such as a near-field infrared signal. The line laser module further includes a positioning device for docking 190 in communication with the charging station. It should be understood that the positioning device for docking 190 is disposed at the module body 140, and the positioning device for docking 190 is configured to receive an infrared signal from the charging station.

In some embodiments of the present disclosure, the line laser module includes the positioning device for docking 190, when the device body 200 on which the line laser module is mounted is required to be charged, the device controller controls the positioning device for docking 190 to search infrared signals near the charging station and guide the device body 200 to dock into the charging station according to an infrared signal when the position device for docking 190 receives the infrared signal. Further, the positioning device for docking 190 further includes an infrared laser emitter 150 configured to emit an infrared signal. When the device body 200 is successfully docked into the charging station, the device controller controls the infrared laser emitter 150 to emit the infrared signal to the charging station, so as to charge the device body 200.

For example, the positioning device for docking 190 includes an infrared receiving device 160 and the infrared laser emitter 150. The infrared receiving device 160 is configured to receive the infrared signal, and the infrared laser emitter 150 is configured to emit the infrared signal. In an embodiment of the present disclosure, the infrared receiving device 160, the infrared laser emitter 150, the first camera 120, the second camera 130, and the line laser emitter 110 are all disposed on the module body 140, which achieves a modular design of the sensing system and is convenient for assembly and maintenance.

Furthermore, the infrared receiving device 160 of the positioning device for docking 190 includes at least two infrared detectors disposed regularly in a lateral direction on a top of the device body. Such a configuration ensures reliability with which the infrared receiving device 160 receives an infrared signal for docking and ensures reliability of communication between the device body and the charging station. In some embodiments of the present disclosure, the infrared receiving device includes any number of infrared detectors. The infrared laser emitter 150 of the positioning device for docking 190 includes at least one infrared lamp. It should be noted that the infrared receiving device 160 and the infrared laser emitter 150 may be disposed at other positions meeting the requirements, which is not limited in the present disclosure.

In some embodiments of the present disclosure, the device controller is configured to control the autonomous mobile device to move based on an obstacle distance information and an obstacle type information. The device controller may be directly connected with the primary control unit 003, so as to acquire directly the obstacle distance information and the obstacle type information that are obtained by processing the first environment image and the second environment image through the primary control unit 003. Alternatively, the device controller may be connected with the primary control unit 003 through a memory, wherein the obstacle distance information and the obstacle type information obtained by the primary control unit 003 is stored in the memory, and the device controller may directly access the distance from obstacle and the obstacle type stored in the memory.

In some embodiments of the present disclosure, the device controller and the primary control unit 003 may be two independent circuits. For example, the device controller and the primary control unit 003 are two independent chips. In some embodiments of the present disclosure, the device controller and the primary control unit 003 may be integrated in one circuit. For example, the device controller and the primary control unit 003 are integrated in a chip. The type of the chip is not limited here, as long as their respective functions are achieved.

In some embodiments of the present disclosure, the device body 200 is provided with a moving mechanism such as a roller, a track and the like, and the device controller controls the moving mechanism to achieve movement of the autonomous mobile device.

Figure 3:
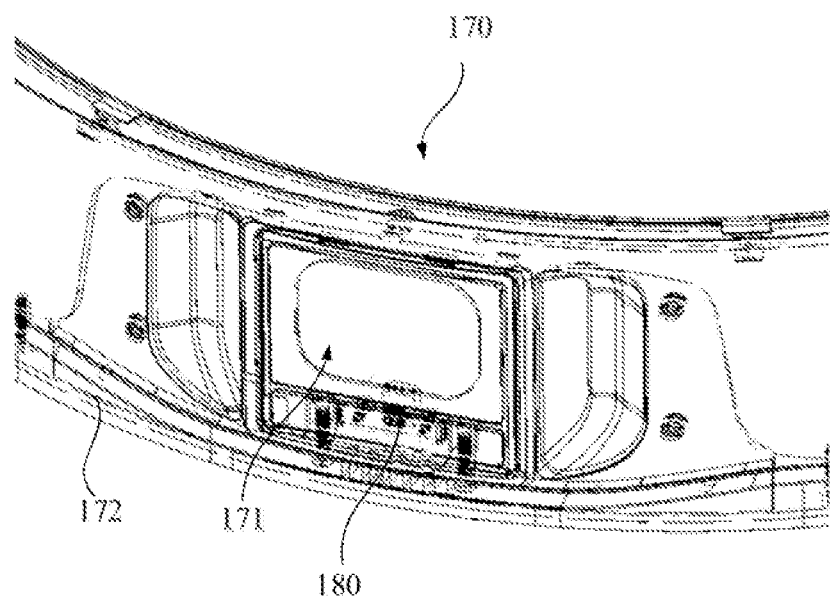
FIG. 3 illustrates a partial schematic structural view of a buffer component according to an embodiment of the present disclosure.

In some embodiments of the present disclosure, as illustrated in FIG. 3, the autonomous mobile device further includes a buffer component 170. The buffer component 170 is disposed at a front side of the device body 200 and the line laser module is disposed between the buffer component 170 and the device body 200. That is, the first camera 120, the second camera 130, the line laser emitter 110, and the positioning device for docking 190 are all disposed between the buffer component 170 and the device body 200. Thus, the buffer component 170 protects the first camera 120, the second camera 130, the line laser emitter 110, and the positioning device for docking 190 to some degree, and protects the first camera 120, the second camera 130, the line laser emitter 110, and the positioning device for docking from damage by external forces. This is beneficial to improve service lives of the first camera 120, the second camera 130, the line laser emitter 110, and the positioning device for docking 190. A window 171 is provided at a position of the buffer component 170 facing the first camera 120 and the second camera 130, so that ambient light enters the first camera 120 and the second camera 130. A window is provided at a position of the buffer component 170 facing the line laser emitter 110, so that laser emitted by the line laser emitter 110 can be emitted outward passing through the buffer component 170. A window is provided at a position of the buffer component 170 facing the positioning device for docking 190, so that the positioning device for docking 190 can receive and emit infrared signals, so as to ensure the reliability of the line laser module.

It should be understood that the buffer component 170 may serve as a bumper for the device body 200. When mounting the line laser module onto the module body, the module body 140 assembled with the first camera 120, the second camera 130 and the line laser emitter 110 is firstly mounted on the device body 200, and then the buffer component 170 (for example, a bumper) is connected to the module body 140 or the device body 200.

In some embodiments of the present disclosure, the buffer component 170 includes a bumper 172 and an elastic member. The bumper 172 and the module body 140 are connected through the elastic member, wherein the line laser module is disposed at an inner side of the bumper 172. By providing the elastic member, forces applied on the device body 200 and the line laser module by the bumper 172 is decreased when the buffer component 170 collides with obstacles, thereby providing a certain buffering effect, which further reduces damage to the module body and the line laser module by the obstacle. By providing a rubber layer at an outer side of the bumper 172, when the buffer component 170 collides with obstacles, the rubber layer directly contacts with the obstacles. That is, the rubber layer provides a good protective effect to the bumper 172, and the rubber cushion layer is an elastic member, which can further provide a buffering function. That is to say, the buffer component 170 of the present disclosure has a dual buffering effect by providing the elastic member and the rubber layer, which greatly reduces the possible damage to the module body 200 and the line laser module by the obstacles, and improves the reliability of the autonomous mobile device. For example, the elastic member is an elastic column and/or a spring, and may alternatively be other elastic members meeting the requirements.

In some embodiments of the present disclosure, the autonomous mobile device further includes a supplement lamp 180 and an ambient light sensor. The ambient light sensor is configured to detect intensity of ambient light, and the supplement lamp 180 is disposed on the buffer component 170 adjacent to the window 171 corresponding to the second camera 130. Thus, when the ambient light is too weak to enable the second camera 130 to capture a clear and accurate environment image, that is, the current ambient light is not strong enough to meet exposure requirement of the second camera 130, the supplement lamp 180 is configured to provide supplement illumination for the second camera 130 to shoot, so as to ensure that the second camera 130 can capture a clear and accurate environment image, thereby improving accuracy of obstacle recognition.

Figure 8:
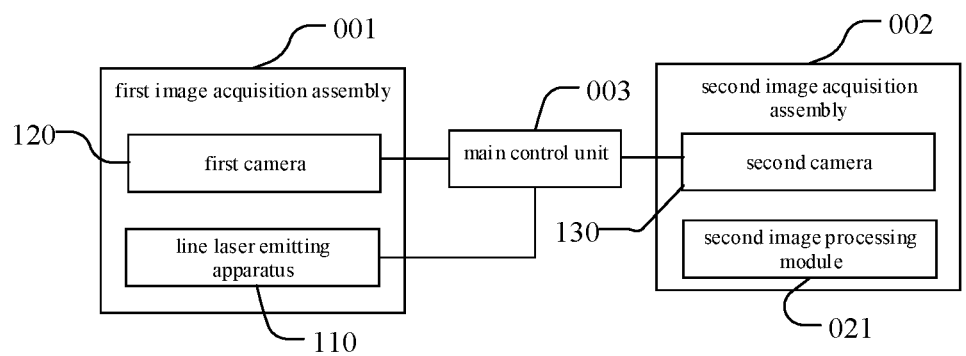
FIG. 8 illustrates a block diagram of a line laser module according to an embodiment of the present disclosure.

As illustrates in FIG. 8, the line laser module includes: a module body 140 and a first image capturing assembly 001, wherein the first image capturing assembly 001 includes a first camera 120, at least one line laser emitters 110 and a first image processing module 011 disposed on the module body 140. The at least one line laser emitters 110 is disposed adjacent to the first camera 120, and is configured to emit a line laser with a linear projection. The first camera 120 cooperates with the at least one line laser emitter 110 to capture a first environment image. The first image processing module 011 is configured to acquire obstacle distance information based on the first environment image. The obstacle distance information indicates a distance from the first camera to an obstacle when the first environment image is captured. The line laser emitter 110 is movably connected with the module body 140, and/or the module body 140 is an active structure, so that an azimuth angle and/or a rotation angle of the line laser emitter 110 can be adjusted.

In the line laser module according to embodiments of the present disclosure, the first camera 120 and the at least one line laser emitter 110 cooperates with each other, such that obstacles or terrain in front of the device body 200 can be recognized, so as to perform a corresponding obstacle avoidance or cleaning. The line laser emitter 110 is movably connected with the module body 140, an azimuth angle and/or a rotation angle of the line laser emitter can be adjusted by adjusting a position of the line laser emitter with respect to the module body 140. The module body 140 is an active structure, such that the azimuth angle and/or the rotation angle of the line laser emitter can be adjusted by adjusting relative positions of various components of the module body 140. In addition, the line laser emitter 110 is movably connected with the module body 140 and the module body 140 is an active structure, such that the azimuth angle and/or the rotation angle of the line laser emitter can be adjusted by adjusting the position of the line laser emitter with respect to the module body 140 and adjusting relative positions of various components of the module body 140. Thus, when assembling the line laser emitter 110 to the module body 140, it is convenient to adjust an irradiation angle and an irradiation range of a line laser emitted by the line laser emitter 110, so as to quickly and conveniently make the line laser perpendicular to a horizontal plane and in a field of view of the first camera 120, thereby simplifying operations of assembling and improving assembling efficiency.

Furthermore, by reasonably adjusting the azimuth angle of the at least one line laser emitter 110, the line laser can be located within a field of view of the first camera 120, so as to ensure that the first camera 120 can accurately and comprehensively capture a light emitted by the line laser emitter that is reflected by obstacles, such that accuracy and comprehensiveness of the first environment captured by the first camera 120. It can be understood that after the azimuth angle of the at least one line laser emitters 110 adjacent to the first camera 120 has been adjusted, the at least one line laser emitter 110 can be adhered to the module body by adhesive. By reasonably adjusting the rotation angle of the line laser emitter 110, the line laser is made to be perpendicular to a horizontal plane, which is beneficial to improving a ranging scope.

The at least one line laser emitter 110 is movably connected with the module body 140, so that the azimuth angle and the rotation angle of the at least one line laser emitter 110 can be adjusted by adjusting a position of the at least one line laser emitter 110 with respect to the module body 140. The module body 140 is an active structure, so that the azimuth angle and the rotation angle of the at least one line laser emitter 110 can be adjusted by adjusting relative positions of various components of the module body 140. The at least one line laser emitter 110 is movably connected with the module body 140, and the module body 140 is an active structure, such that the azimuth angle and the rotation angle of the at least one line laser emitter 110 can be adjusted by adjusting the position of the at least one line laser emitter 110 with respect to the module body 140 and adjusting relative positions of various components of the module body 140. In the embodiments of the present disclosure, the azimuth angle and the rotation angle of the at least one line laser emitter 110 can be adjusted through various manners, thereby meeting requirements on various structures of the module body 140 and on various connection manners between the at least one line laser emitter 110 and the module body 140.

Figure 4:
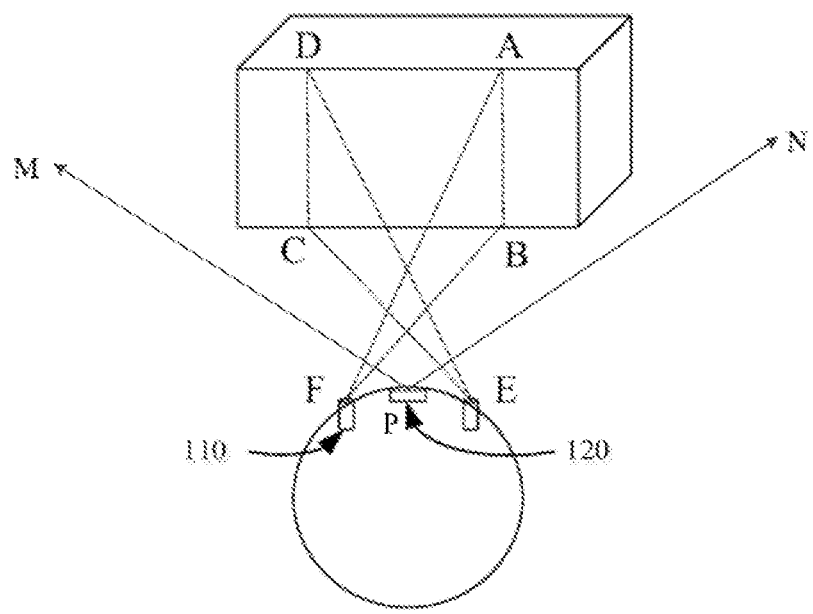
FIG. 4 illustrates a schematic diagram of operation principle of a line laser emitter according to an embodiment of the present disclosure.

Further, the line laser module includes two line laser emitters 110. Both the two line laser emitters 110 are configured to emit a line laser with a linear projection. For example, the at least one line laser emitters 110 respectively emit a laser plane outwards. When the laser planes reach an obstacle, line lasers is formed on a surface of the obstacle, and an environment image may be captured with the line lasers. As illustrated in FIG. 1, a plane AOB indicates a laser plane emitted by a line laser emitter 110, which is a vertical plane. And as illustrated in FIG. 4, planes ABF and CDE indicates laser planes of two line laser emitters 110, and a line segments AB and a line segments CD in FIG. 4 indicates the line lasers. In some embodiments of the present disclosure, the line laser emitter 110 is a laser diode. It should be understood that the line laser emitter 110 may be other structures meeting the requirements, which is not limited in the present disclosure. It should be understood that a wavy mirror can also be provided in emission direction of the line laser emitter 110 (such as a moving direction of the autonomous mobile device). In some embodiments of the present disclosure, the wavy mirror is a concave lens. For example, the concave lens is disposed in front of the laser diode. The laser diode emits light of a specific wavelength (such as infrared light), which becomes divergent light after passing through the concave lens, so as to form a line on a plane perpendicular to an optical path.

Figure 5:
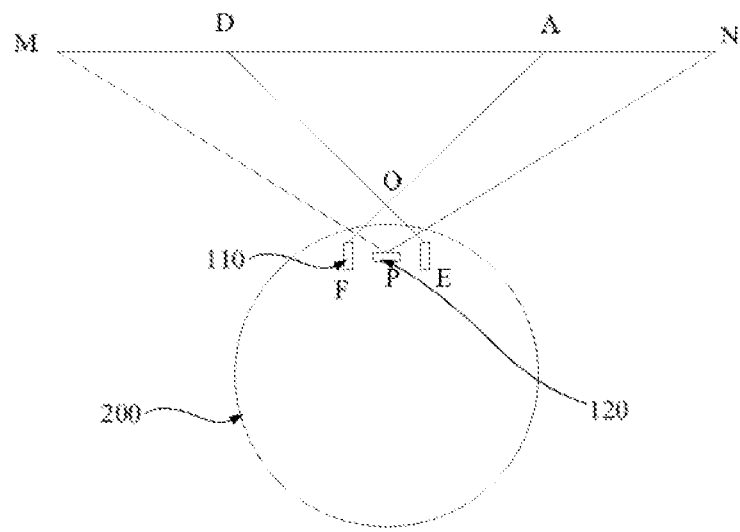
FIG. 5 illustrates a schematic diagram of a relationship in the field angle of view between a line laser emitter and a first camera according to an embodiment of the present disclosure.

As illustrated in FIGS. 4 and 5, the line laser module includes two line laser emitters 110 disposed on respective sides of the first camera 120, and the first camera 120 and the two line laser emitters 110 cooperate with each other. That is, both the two line laser emitters 110 emit line lasers which are perpendicular to the horizontal plane and located within a field of view of the first camera 120, and the first environment image captured by the first camera 120 contains the line lasers emitted by the line laser emitter 110 that are reflected by the obstacle. The obstacle distance information can be acquired based on the first environment image, and moreover, a distance between the obstacle and the device body 200 or a distance between the obstacle and the line laser module can also be measured, so as to perform the corresponding obstacle avoidance.

In this embodiment of the present disclosure, by adjusting mounting positions and mounting angles of the two line laser emitter 110 with respect to the module body 140, and/or adjusting relative positions of various components of the module body 140, the rotation angles and the azimuth angles of the two line laser emitters 110 can be adjusted. The adjustment of the rotation angles of the line laser emitters 110 can make the line lasers perpendicular to the horizontal plane. Adjustment of the azimuth angles of the two line laser emitters 110 can adjust angles between the line lasers and an optical axis of the first camera 120, so that the line lasers are located within the field of view of the first camera 120. Then, the azimuth angles of the line laser emitters 110 on respective sides of the first camera 120 can be adjusted, so as to determine an intersection of the line lasers emitted by the two line laser emitters 110 disposed on respective sides of the first camera 120 within the field of view of the first camera 120. Then the laser emitters disposed on respective sides of the first camera 120 can be fixed by applying adhesive, so as to achieve measurement of the distance from the obstacle in front of the device body 200.

In an embodiment of the present disclosure, FIG. 4 illustrates a schematic diagram of operation principle of a line laser emitter, wherein letter P indicates the first camera 120; letters E and F respectively indicate line laser emitters 110 located on respective sides of the first camera 120; and straight lines PM and PN respectively indicates two boundaries of a horizontal field of view of the first camera 120, that is, ∠MPN represents a horizontal field angle of view of the first camera 120. A first line laser emitter 110 emits a laser plane FAB outwards and a second line laser emitter 110 emits a laser plane ECD outwards. After the laser planes FAB and ECD reach the obstacle, line lasers will be formed on the surface of the obstacle, namely, the line segment AB and the line segment CD illustrated in FIG. 4. Since the line laser line segment AB and the line laser line segment CD emitted by the line laser emitters are located within the field of view of the first camera, the line lasers may be used to detect information such as contour, height and/or width of an object within the field of view of the first camera, and the first camera 120 may capture a first environment image of environment illuminated by the line lasers.

Further, the primary control unit 003 is configured to send operation instructions to the first image capturing assembly 001. For example, the primary control unit 003 may calculate the distance from the line laser module or the device body 200 where the line laser module is located to the obstacle in front of the device body based on the first environment image captured by the first camera 120. For example, the distance between the line laser module or the device body 200 and the obstacle in front of device body may be calculated through a triangulation. In an embodiment of the present disclosure, as illustrated in FIG. 5, which is a schematic diagram in one perspective of the embodiment illustrated in FIG. 4. As illustrated in FIG. 5, the letter P indicates the first camera 120, the letters E and F indicate the line laser emitter 110 located on respective sides of the first camera 120, the point A represents a projection of the line segment AB on the horizontal plane, and a point D represents a projection of the line segment CD in the horizontal plane, the ∠MPN represents the horizontal field angle of view of the first camera 120, and a point O represents an intersection of the line laser emitted by the line laser emitter 110 and the optical axis of the first camera 120. Taking a second line laser emitter 110 disposed at the point F as an example, when the second line laser emitter 110 and the first camera 120 are fixedly mounted to the module body 140, a focal length of the first camera 120 is known, and an emission angle of the second line laser emitter 110 is known, that is, an angle between a line FA and the optical axis PO is known, and a length of a line segment OP is known. A distance between the second line laser emitter 110 and an image plane is known. An image of point A on the obstacle in the first environment image captured by the first camera 120 is defined as point A'. Since the point A' is offset with respect to the optical axis PO of the first camera 120 by a certain offset which is known, based on a triangle similarity principle, and combined with the above known conditions, a distance between point A and point F can be measured. That is, the distance between the obstacle and the line laser emitter 110 can be obtained. It should be understood that, it is also possible to determine the terrain ahead based on deformation characteristics of line segments reflected by the obstacle and captured by the first camera 120, so as to determine which operation to be performed, such as obstacle avoidance or cleaning.

In some embodiments of the present disclosure, the number of the first camera(s) 120 is not limited. For example, the number of the first camera(s) 120 may be one, two, three or any other numbers meeting the requirements. It should be understood that, in embodiments of the present disclosure, the total number of the line laser emitter(s) 110 is also not limited. For example, the number of line laser emitter(s) 110 may be two or more. In embodiments of the present disclosure, the number of the line laser emitter(s) 110 disposed on each side of the first camera 120 is also not limited, and the number of the line laser emitter(s) 110 on each side of the first camera 120 may be one, two or more. In addition, the numbers of the line laser emitter(s) 110 disposed on respective sides of the first camera 120 may be the same or different. It should be understood that when the number of the line laser emitters 110 on either side of the first camera 120 is plural, the plurality of line laser emitters 110 disposed on each side of the first camera 120 may be juxtaposed horizontally or vertically, which is not limited in the present disclosure.

Further, in some embodiments of the present disclosure, the first camera 120 can not only measure a distance from the obstacle in front of the device body 200 to acquire obstacle distance information, but also identify a type of the obstacle to acquire obstacle type information. For example, the first camera 120 is configured to measure the distance from the obstacle and identify the type of the obstacle respectively at different timings. For example, the primary control unit 003 first identifies the type of the obstacle based on a first environment image captured by the first camera 120, and determines whether the device body 200 is required to perform obstacle avoidance or not based on the type of the obstacle. When the device body 200 is required to perform the obstacle avoidance, the primary control unit 003 determines the distance from the obstacle to acquire obstacle distance information based on a second environment image captured by the first camera 120, so as to perform the corresponding obstacle avoidance. When the device body 200 is not required to perform the obstacle avoidance, the autonomous mobile device continues its previous operation, thereby reducing the possibility that the autonomous mobile device performs obstacle avoidance mistakenly.

In some embodiments of the present disclosure, as illustrated in FIG. 1, the line laser emitter 110 is movably connected with the module body 140, and the module body 140 is an active structure. In some embodiments of the present disclosure, the module body 140 includes a main body 141 and a connecting portion 143, wherein the first camera 120 is disposed on the main body 141, and the line laser emitter 110 is connected with the main body 141 via the connecting portion 143. The connecting portion 143 is provided with a through hole, and the line laser emitter 110 passes through the connecting portion 143 via the through hole, and the line laser emitter 110 is rotatably connected with the connecting portion 143. That is, the line laser emitter 110 is rotatable within the through hole of the connecting portion 143. Then, a rotation angle of the line laser emitter 110 is adjusted to make a line laser perpendicular to the horizontal plane, such that the ranging range may be expanded. The connecting portion 143 is movably connected with the main body 141. For example, the connecting portion 143 is horizontally rotatable with respect to the main body 141. That is, a rotating axis of the connecting portion 143 with respect to the main body 141 is a vertical line, so that the connecting portion 143 along with the line laser emitter 110 rotate with respect to the main body 141 in a horizontal plane, thus an azimuth angle of the line laser emitter 110 may be adjusted, such that the line laser emitted by the line laser emitter 110 is located within a field of view of the first camera 120.

It should be understood that since the line laser emitter 110 is rotatable with respect to the connecting portion 143, the connecting portion 143 is movable with respect to the main body 141, so that during an assembling procedure, the rotation angle of the line laser emitter 110 can be adjusted by rotating the line laser emitter 110 to a suitable position within the through hole of the connecting portion 143. That is, adjustment of the line laser emitter 110 can be completed. By rotating the connecting portion 143 to a suitable position with respect to the main body 141, the azimuth angle of the line laser emitter 110 can be adjusted. That is, the adjustment of the line laser emitter 110 with the first camera 120 can be completed, which is simple to operate. It can be understood that after the rotation angle and the azimuth angle of the line laser emitter 110 are adjusted, the connecting portion 143, the main body 141 and the line laser emitter 110 may be fixedly connected by a fixing component. For example, adhesives/glue may be applied to fix an end 142, the main body 141 and the line laser emitter 110 together, which is easy to operate.

In an embodiment of the present disclosure, further, the main body 141 is provided with a positioning groove 144, and the connecting portion 143 is provided with a protrusion structure 145 adapted to fit the positioning groove 144. The connecting portion rotates horizontally in the positioning groove 144 through the protrusion structure 145. For example, the protrusion structure 145 protrudes in a vertical direction, so that the connecting portion 143 rotates in the plane parallel to the horizontal plane with respect to the main body 141. That is, a rotating axis of the connecting portion 143 with respect to the main body 141 is a straight line in the vertical direction. Therefore, the protrusion structure 145 of the connecting portion 143 rotates horizontally in the positioning groove 144 of the main body 141, which drives the line laser emitter 110 to rotate horizontally around the protrusion structure 145 with respect to the main body 141 Furthermore, the line laser emitted by the line laser emitter 110 can be located within the field angle of view of the first camera 120, so as to achieve adjustment between the line laser emitter 110 and the first camera 120, providing a simple structure and a convenient operation. It can be understood that the positioning groove 144 may be a circular positioning groove, and the protrusion structure 145 may be a cylindrical protrusion structure. With fitting between the circular positioning groove and the cylindrical protrusion structure, it is beneficial to improve smooth and reliability of a rotation of the connecting portion 143 with respect to the main body 141. It can be understood that the positioning groove 144 may have any other groove shape which meets the requirements.

In some embodiments of the present disclosure, as illustrated in FIG. 1, the line laser emitter 110 is cylindrical, an outer peripheral side of the line laser emitter 110 is provided with a first step structure 111, the module body 140 is provided with the installation groove configured to install the line laser emitter 110, and an inner wall of the installation groove is provided with a second step structure 149. Through matching of the first step structure 444 with the second step structure 149, movement of the line laser emitter 110 in the axial direction can be limited, which is beneficial to improve the assembling efficiency.

Figure 2:
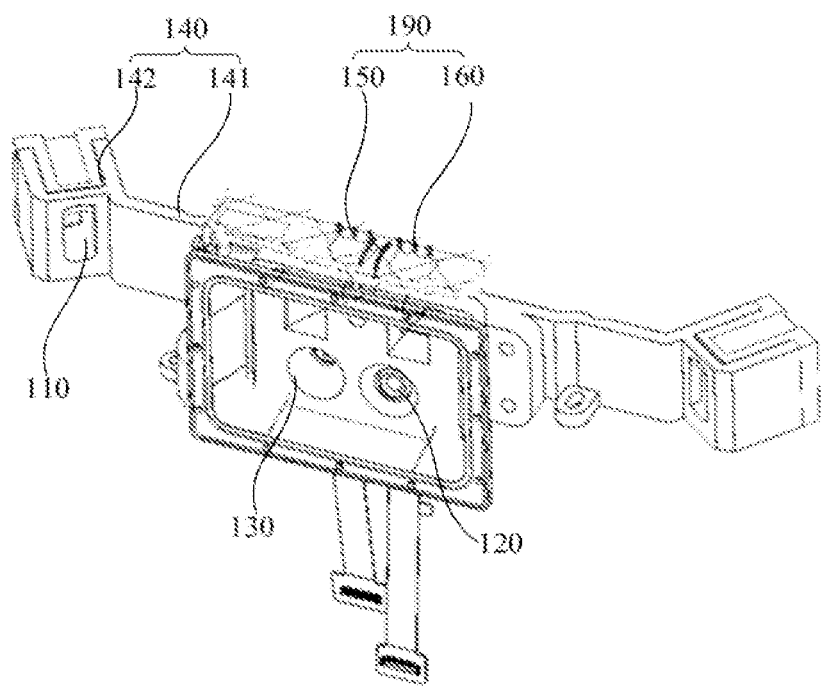
FIG. 2 illustrates a schematic structural view of a line laser module according to an embodiment of the present disclosure.

In some embodiments of the present disclosure, the line laser emitter 110 is movably connected with the module body 140, and the module body 140 is an active structure. As illustrated in FIG. 2, the module body 140 includes the main body 141 and two ends 142 disposed on respective sides of the main body 141, the first camera 120 is provided at the main body 141, and the line laser emitter 110 is provided at the end 142. In some embodiments of the present disclosure, each end 142 is pivotally connected to the main body 141. For example, each end 142 is hinged on the main body 141, so that each end 142 rotates with respect to the main body 141. The line laser emitter 110 is rotationally connected with the end 142. For example, the line laser emitter 110 is cylindrical, and the line laser emitter 110 rotates with respect to an installation groove provided in the end 142. Then, an rotation angle of the line laser emitter 110 can be adjusted, so that the line laser is perpendicular to the horizontal plane, which enlarges the ranging range. Since the line laser emitter 110 is installed to the end 142 and the end 142 is rotatable with respect to the main body 141, the azimuth angle of the line laser emitter 110 can be adjusted, so that the line laser emitted by the line laser emitter 110 is located within the field angle of view of the first camera 120.

It should be understood that since the line laser emitter 110 is rotatable with respect to the end 142 and the end 142 is pivotally connected with the main body 141, during assembling, the rotation angle of the line laser emitter 110 can be adjusted by rotating the line laser emitter 110 to the suitable position. That is, the adjustment of the line laser emitter 110 can be achieved. By rotating the end 142 to the suitable position with respect to the main body 141, the azimuth angle of the line laser emitter 110 can be adjusted. That is, the adjustment of the line laser emitter 110 with respect to the first camera 120 can be achieved. This is easy to operate and convenient to assemble. It should be understood that after the rotation angle and the azimuth angle of the line laser emitter 110 are adjusted, the end 142, the main body 141 and the line laser emitter 110 can be fixedly connected by a fixing means, such as adhesives, glue, and etc., which is easy to operate.

In some embodiments of the present disclosure, the line laser emitter 110 and the module body 140 are movably connected. For example, the module body 140 is provided with an installation cavity which is configured to install the line laser emitter 110. The line laser emitter 110 is movably provided within the installation cavity. The installation cavity includes a first end and a second end, wherein a cross-sectional area of the first end is smaller than a cross-sectional area of the second end. That is, the installation cavity is a flared structure with the cross-sectional area of the first end being larger than the cross-sectional area of the line laser emitter 110, such that the line laser emitter 110 is movable in the installation cavity. A front end of the line laser emitter 110 is disposed adjacent to the first end of the installation cavity. By rotating the line laser emitter 110 with respect to an axis of the installation cavity, the rotation angle of the line laser emitter 110 can be adjusted, so as to make the line laser perpendicular to the horizontal plane and enlarge the ranging range. By rotating the rear end of the line laser emitter 110 with respect to the front end of the line laser emitter, the azimuth angle of the line laser emitter 110 can be adjusted, so that the line laser emitted by the line laser emitter 110 is located within the field angle of view of the first camera 120.

It should be understood that since the line laser emitter 110 is movably provided within the installation cavity of the module body 140, the line laser emitter 110 can rotate around the axis of the main body 141 and a point (the front end of the line laser emitter 110), respectively. Thus, during the adjustment procedure, the rotation angle and the azimuth angle of the line laser emitter 110 can be adjusted, by reasonably adjusting the installation angle and the installation position of the line laser emitter 110 with respect to the module body 140, which is simple to operate and convenient to assemble. It should be understood that after the rotation angle and the azimuth angle of the line laser emitter 110 are adjusted, the line laser emitter 110 and the module body 140 can be fixedly connected by a fixing means, such as adhesives, glue, etc. Thus, an assembly of the line laser emitter 110 and the module body 140 can be completed, which is easy to operate.

Figure 6:
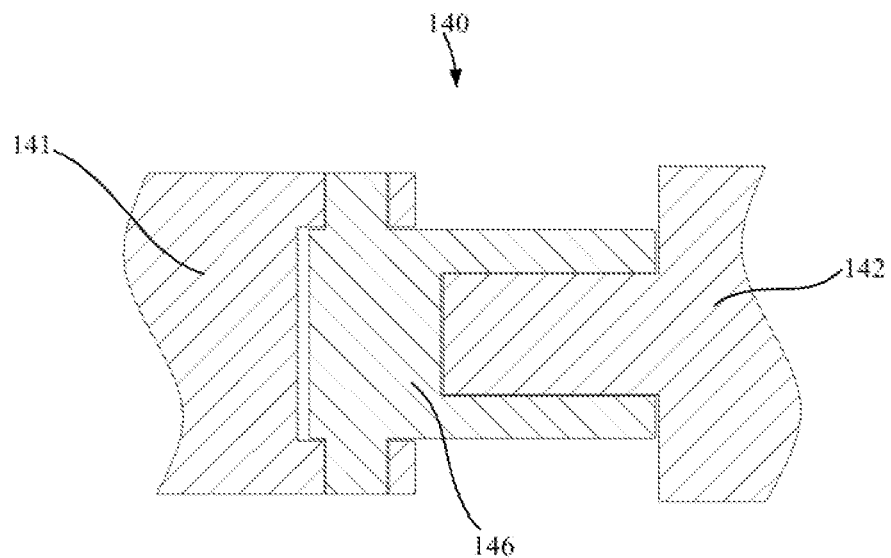
FIG. 6 illustrates a partial schematic structural view of a module body according to an embodiment of the present disclosure.

In some embodiments of the present disclosure, the module body 140 is an active structure. As illustrated in FIG. 6, a module body 140 includes a main body 141, two ends 142 and a connection part 146. The ends 142 are located at respective sides of the main body 141, the first camera 120 is provided at the main body 141, and the line laser emitter 110 is provided at the end 142. For example, the line laser emitter 110 is fixedly or detachably installed on the end 142. The connection part 146 is pivotally connected with the main body 141 and the end 142 is connected with the connection part 146. Then, the connection part 146 pivots with respect to the main body 141 to adjust the azimuth angle of the line laser emitter 110, so that the line laser emitted by the line laser emitter 110 is located within the field of view of the first camera 120. The end 142 is rotatably connected with the connection part 146. When the end 142 rotates with respect to the connection part 146, the rotation angle of the line laser emitter 110 is adjusted so as to make the line laser perpendicular to the horizontal plane, thereby enlarging the ranging range.

In an embodiment of the present disclosure, the connection part 146 is hinged on the main body 141, a side of the connection part 146 facing the end 142 is provided with a hole, and the end 142 is provided with a cylindrical protrusion adapted to mate with the hole. After the line laser emitter 110 is assembled to the end 142, the cylindrical protrusion of the end 142 is inserted into the hole and rotates in the hole so as to adjust the rotation angle of the line laser emitter 110. When the line laser is perpendicular to the horizontal plane, the end 142 and the connection part 146 are fixed, such as through glue or other fastening structure, so as to achieve the fitting of the line laser emitter 110. Then, by adjusting a relative position of the connection part 146 with respect to the main body 141, the azimuth angle of the line laser emitter 110 can be adjusted. After the line laser emitted by the line laser emitter 110 is located at a suitable position within the field of view of the first camera 120, the main body 141 and the connection part 146 are fixed, such as through the glue or other fastening structure, so as to achieve the fitting between the line laser emitter 110 and the first camera 120. It should be understood that since the main body 140 is an active structure, that is, the end 142 is movably connected with the main body 141 by the connection part 146, during the procedure of fitting, the rotation angle and the azimuth angle of the line laser emitter 110 installed at the end 142 can be adjusted, by rotatably adjusting the relative positions of the end 142, the connection part 146 and the main body 141, which is simple to operate and convenient to calibrate. It should be understood that after the rotation angle and the azimuth angle of the line laser emitter 110 are adjusted, the end 142, the connection part 146 and the main body 141 can be fixedly connected by the fixing structures, for example, the end 142, the connection part 146 and the main body 141 are fixed together by adhesives, glue, a fastening part 147 or the like, which is easy to operate.

Figure 7:
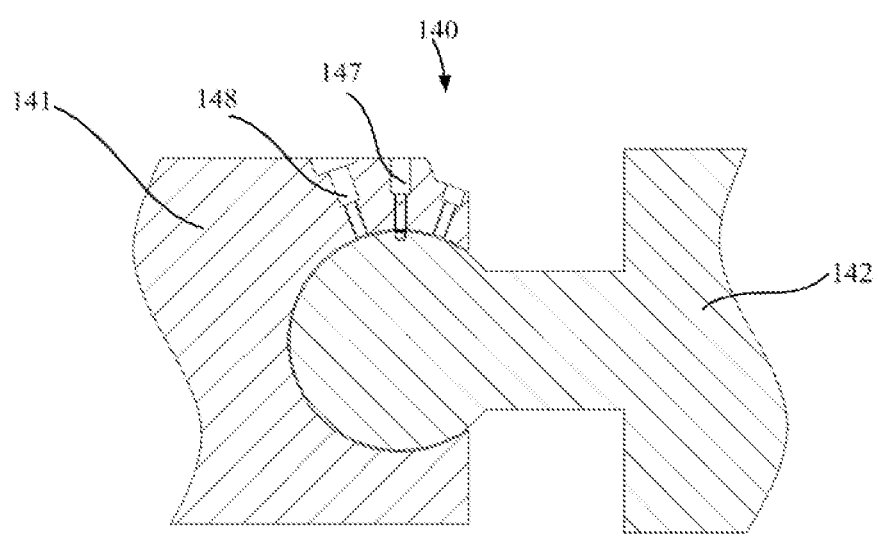
FIG. 7 illustrates a partial schematic structural view of a module body according to another embodiment of the present disclosure.

In some embodiments of the present disclosure, the module body 140 is an active structure. As illustrated in FIG. 7, in an embodiment of the present disclosure, the module body 140 includes a main body 141, two ends 142 and a fastening part 147. The two ends 142 are located on respective sides of the main body 141, the first camera 120 is provided at the main body 141, and the line laser emitter 110 is provided at the end 142. As illustrated in FIG. 7, the end 142 is rotatably connected with the main body 141, for example, the end 142 is connected with the main body 141 through a ball joint, so that the end 142 can sway with respect to the main body 141 and rotate with respect to the main body 141. The line laser emitter 110 is assembled on the end 142. Thus, the line laser emitter can sway and/or rotate with respect to the module 141 through the end 142, thereby adjusting the azimuth angle and the rotation angle of the line laser emitter 110, which is simple to operate and convenient to fit.

In some embodiments of the present disclosure, the end 142 is connected to the main body 141 through a ball joint, the main body 141 is provided with a limiting hole 148, and the limiting part 147 is a set screw. The rotation angle of the line laser emitter 110 is adjusted by rotating the end 142 with respect to the main body 141. When the line laser is perpendicular to the horizontal plane, the fitting of the line laser emitter 110 is achieved. By adjusting a sway position of the end 142 with respect to the main body 141, the azimuth angle of the line laser emitter 110 is adjusted. When the line laser emitted by the line laser emitter 110 is located at a suitable position within the field of view of the first camera 120, the fitting between the line laser emitter 110 and the first camera 120 is achieved. Then the set screw is configured to pass through the limiting hole 148 and fix a relative position of the end 142 with respect to the main body 141, thereby fixing the end 142 and the main body 141, which is simple to operate. It should be understood that, there may be one or more limiting hole(s) 148 on the main body 141. Based on different positions of the limiting holes 148, different amounts of the limiting holes 148 are provided, so as to meet that the end 142 and the main body 141 can be fixed by the set screws passing through the limiting holes 148 when the end 142 rotates to different relative positions with respect to the main body 141. The set screw may alternatively be an elastic member. That is, an end of the set screw abutting the end 142 is an elastic member, and the end 142 and the main body 141 are reliably connected by elasticity. It should be understood that a spherical surface of the end 142 may further be provided with a positioning hole adapted to mate with the set screw, so that the set screw passes through the limiting hole 148 and is compressed after mating with the positioning hole. This is beneficial to improve the reliability of fixed connection between the end 142 and the main body 141.

In some embodiments of the present disclosure, the line laser module includes two line laser emitters. In such a case, the module body includes two ends and two connection parts. Respective connection parts are configured to connect respective ends to the module body, and respective line laser emitters are provided at respective ends. Details of the connection between the ends and the module body through the connection parts can be referred to the foregoing description, and will not be elaborated here.

Figure 9:
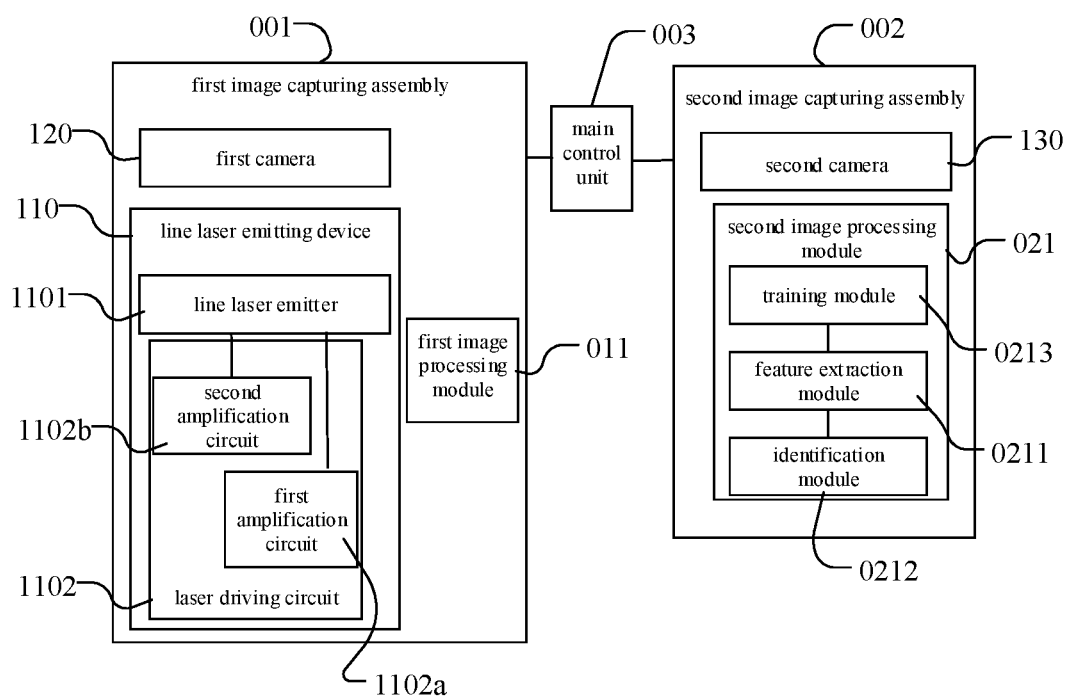
FIG. 9 illustrates a block diagram of a line laser module according to another embodiment of the present disclosure.

In some embodiments of the present disclosure, as illustrated in FIG. 9, the line laser emitter 110 includes a line laser generator 1101 and a laser driving circuit 1102, wherein the line laser driving circuit 1102 is configured to receive a driving signal, and drive the line laser generator 1101 to generate a line laser based on the driving signal.

Further, the laser driving circuit 1102 includes an amplification circuit, which is configured to amplify the driving signal. The amplified driving signal is sent to the line laser generator 1101 to make the line laser generator 1101 generate laser. In some embodiments of the present disclosure, the driving signal includes a control signal and an adjustment signal. The line laser emitter 1101 may be controlled to turn ON or OFF by the control signal, and power of the laser generated by the line laser generator 1101 is be adjusted according to the adjustment signal.

In some embodiments of the present disclosure, as illustrated in FIG. 9, the amplification circuit includes a first amplification circuit 1102*a* and a second amplification circuit 1102*b*.

The first amplification circuit 1102*a* is configured to receive the control signal sent by the primary control unit 003, amplify the control signal and send the amplified control signal to the line laser emitter 1101, so as to control the line laser emitter 1101 to turn on or turn off.

The second amplification circuit 1102*b* is configured to receive the adjustment signal sent by the primary control unit 003, amplify the adjustment signal and send the amplified adjustment signal to the line laser emitter 1101, so as to control the power of the laser generated by the line laser emitter 1101.

Specific structures of the first amplification circuit 1102*a* and the second amplification circuit 1102*b* will not be elaborated herein, as long as a signal amplification function can be achieved.

In some embodiments of the present disclosure, as illustrated in FIGS. 8 and 9, the line laser module further includes a second image capturing assembly 002, and the second image capturing assembly 002 includes a second camera 130 provided at the module body 140 and a second image processing module 021, wherein the second camera 130 is configured to capture a second environment image. The second image capturing assembly 002 may be connected to the primary control unit 003, and receive operation instructions from the primary control unit 003. For example, the second camera 130 is connected to the primary control unit 003 of the autonomous mobile device, the primary control unit 003 can perform an exposure control on the second camera 130, and the second camera 130 acquires a second environment image based on an exposure instruction of the primary control unit. The primary control unit analyzes and processes the second environment image, so as to identify a type of the obstacle to acquire obstacle type information.

In some embodiments of the present disclosure, the first camera 120, the second camera 130 and the line laser emitter 110 cooperate with each other, to determine obstacle distance information according to the first environment image captured by the first camera 120 and obstacle type information according to the second environment image captured by the second camera 130. Therefore, the type of the obstacle is be determined based on the second environment image captured by the second camera 130, and it is determined based on the type of the obstacle whether the device body 200 needs to perform obstacle avoidance operation. When the device body 200 needs to perform the obstacle avoidance operation, a distance from the obstacle is determined through cooperation between the first camera 120 and the line laser emitter 110, so as to perform the corresponding obstacle avoidance operation. When the device body 200 does not need to perform the obstacle avoidance operation, the device body 200 continues its previous operation, thereby reducing possibility that the autonomous mobile device perform obstacle avoidance operation wrongly.

In some embodiments of the present disclosure, amount of the second environment images are plural, such as 500, 1000, or other amount meeting the requirements. For example, the amount of the second environment images is determined by adjusting exposure frequency of the second camera 130. The primary control unit performs image segmentation on a plurality of second environment images captured by the second camera 130 to obtain a plurality of segmented images on which the obstacle type information is marked. Then, the plurality of segmented images after the segmentation are input into a trained obstacle model, and feature extraction is performed on the plurality of segmented images. Confidence match is performed on the extracted feature information and the trained obstacle model, and the type of the obstacle is determined based on a confidence matching result.

That is to say, the line laser module according to the embodiments of the present disclosure can determine the type of the obstacle based on the second environment image acquired by the second camera 130, so that the autonomous mobile device can determine, based on the type of the obstacle, to perform the obstacle avoidance operation or its previous operation. When the obstacle avoidance operation is required, the device controller controls the first camera 120 and the line laser emitter 110 to cooperate, and determines the distance from the line laser module or the device body 200 to the obstacle based on the first environment image acquired by the first camera 120, so as to perform the obstacle avoidance operation.

For example, when it is determined that the obstacle is a balloon based on the second environment image captured by the second camera 130, the driving system drives the device body 200 and the balloon can be taken away due to it relatively light weight, that is, a cleaning route is not affected by the balloon. Therefore, the controller controls the device body 200 to perform the cleaning operation in line with the original cleaning route, rather than to perform the obstacle avoidance operation. This helps to clean a position where the balloon is located, improving accuracy of the obstacle avoidance, and beneficial to enlarge a cleaning range. That is to say, in this case, the line laser emitter 110 and the first camera 120 are not required to work.

As another example, when is determined that the obstacle is a chair based on the second environment image captured by the second camera 130, if cleaning is performed according to its previous route, there is a possibility that the device body 200 collides with the chair, which causes the device body to be damaged due to a heavy weight of the chair, that is, the cleaning route is affected by the chair. In such a case, the device controller controls the device body 200 to perform the obstacle avoidance operation, so as to change the cleaning route. The device controller controls the line laser emitter 110 and the first camera 120 to work, that is, the line laser emitter emits a line laser, and the first camera 120 captures a first environment image of the reflected light reflected by the chair. The device controller determines the distance from the line laser module or the device body 200 to the chair based on the first environment image. Then the device controller re-plans the cleaning route based on the distance to perform the obstacle avoidance operation, which improves obstacle avoidance effect.

Further, in an embodiment of the present disclosure, amount of the second cameras 130 may be one, two, three or other numbers meeting the requirements, which is not limited in the present disclosure. It should be understood that the second camera 130 may be a monocular camera or a binocular camera. In some embodiments of the present disclosure, the first camera 120 and the second camera 130 are provided separately, or the first camera 120 and the second camera 130 may also form a camera module. Setting modes of the first camera 120 and the second camera 130 are not limited in the present disclosure.

In some embodiments of the present disclosure, an optical axis of the first camera intersects with the horizontal direction downward, and the optical axis of the second camera intersects with the horizontal direction upward. In other words, the first camera looks downward on a surface to be cleaned from above, which is intended to see lower obstacles. The second camera looks upward from bottom, in order to see more spatial features and enhance the user's video experience. The angle between the optical axis of the first camera and the horizontal direction is 7 degrees, and the angle between the optical axis of the second camera and the horizontal direction is 5 degrees. In other words, the second camera looks up from the bottom, in order to see more spatial features and enhance the user's video experience.

In some embodiments of the present disclosure, the module body includes a first end, a second end, and a connection part connecting the first end and the second end. The line laser module includes two laser emitters, which are respectively provided at the first end and the second end. The first camera and the second camera are provided at the connection part.

In some embodiments of the present disclosure, the first camera 120 is a monochrome camera, that is, an infrared camera. A first filter is provided in front of the monochrome camera, and the first filter is an infrared lens, which allows only infrared light to pass through. It should be understood that the line laser emitter 110 working in cooperation with the first camera 120 is an infrared laser tube, which emits an infrared laser. The second camera 130 is an RGB camera. A second filter is provided in front of the RGB camera. The second filter is a visible light lens. For example, the visible lens is a white light lens, which allows only visible light to pass through. It should be understood that the first camera 120 and the second camera 130 may alternatively be other structures meeting the requirements, which is not limited in the present disclosure in this regard.

In some embodiments of the present disclosure, the first camera 120 and the second camera 130 are provided side by side horizontally. That is, the first camera and the second camera 130 are distributed left and right. For example, the first camera 120 is located on the left side of the second camera 130, or the first camera 120 is located on the right side of the second camera 130. This structure is beneficial to reduce a height of the line laser module, and can be applied to the device body 200 with a small size in the vertical direction and expand the usage range thereof. It should be understood that, in this case, the line laser emitters 110 are distributed on respective sides of the first camera 120 and the second camera 130. That is, the first camera 120 and the second camera 130 are located between the line laser emitters 110 on both sides.

In some embodiments of the present disclosure, the first camera 120 and the second camera 130 are provided side by side vertically. That is, the first camera and the second camera 130 are arranged in the vertical direction. For example, the first camera 120 is located above the second camera 130, or the first camera 120 is located below the second camera 130. This structure is beneficial to reduce a width of the line laser module in the horizontal direction, and can be applied to the device body 200 with a small size in the horizontal direction and expand the usage range of a product. It should be understood that, in this case, the line laser emitters 110 are distributed on respective sides of the first camera 120 and the second camera 130. That is, the first camera 120 and the second camera 130 are located between the line laser emitters 110 on both sides.

Further, the module body 140 includes the main body 141 and the ends 142 located on respective sides of the main body 141. The first camera 120 and the second camera 130 are provided on the main body 141. The line laser emitters 110 are provided on respective ends 142. The line laser emitter 110 is movably connected with the end 142 and can rotate and sway with respect to the end 142, so that the rotation angle and the azimuth angle of the line laser can be adjusted.

In some embodiments of the present disclosure, as illustrated in FIG. 9, the second image processing module 021 includes a feature extraction module 0211 and an identification module 0212.

The feature extraction module 0211 is configured to perform feature extraction on the second environment image to obtain feature information. The identification module 0212 is configured to input the feature information into an obstacle identification model to identify the obstacle type information.

For example, grayscale information and position information of pixels of the second environment image meeting a certain condition may be taken as the feature information. For example, the second environment image may be preprocessed by the feature extraction module 0211. For example, binarization and the like may be performed on the second environment image. Then, the grayscale information and the position information of each pixel of the preprocessed second environment image can be acquired. Then, a preset grayscale range is compared with the grayscale information of each pixel to obtain the grayscale information located within a grayscale range and position information of a corresponding pixel, as the feature information.

Apparently, alternatively, the feature information may be extracted from the second environment image in other ways, which is not limited here.

The obstacle identification model may be trained through obstacle images in advance, and it may be a neural network model, a classifier or other models, as long as it can determine, based on the feature information, whether there is an obstacle in the second environment image. How the obstacle identification model is trained and the procedure of determining whether there is an obstacle is not limited herein. The obstacles in the present disclosure may be paper scraps, books, table legs, doors, refrigerators, curtains, etc., which are not listed exhaustively here.

When it is determined that there is an obstacle in the second environment image, the identification module 0212 inputs the feature information into a pre-trained obstacle classification model to identify the obstacle type information.

The obstacle classification model is trained by samples of obstacle classification in advance, and it may be a neural network model, a classifier or other models, as long as it can determine the type of the obstacle based on the feature information. How the obstacle identification model is trained and the procedure of determining the type of the obstacle is not limited here. Correspondingly, the second image processing module 021 further includes a training module 0213 configured to generate the obstacle identification model through collected training data.

Obstacle type information indicates whether an obstacle is required to be cleaned and whether the obstacle can be crossed. In the present disclosure, obstacles may be classified into following three types based on their sizes:

A first type of obstacle: obstacles that can be crossed and cleaned, such as paper scraps;

A second type of obstacle: obstacles that cannot be crossed but required to be cleaned, such as books; and A third type of obstacle: obstacles that cannot be crossed and not required to be cleaned, such as doors, walls, table legs, etc.

In some embodiments of the present disclosure, if there is an obstacle in only one of the first environment image and the second environment image, identification result indicates that there is no obstacle. For example, in a case that the obstacle distance information is not detected in the first environment, or it is determined that there is no obstacle in the obstacle type information, it is determined there is no obstacle.

In a case that there are obstacles in both the first environment image and the second environment image, the identification result indicates that there are obstacles. At this time, the type of the obstacle may be determined based on the second environment image. For example, the obstacle distance information is received, and it is determined that there is an obstacle in the obstacle type information.

For the first type of obstacle, the device controller controls the autonomous mobile device to continue moving according to a current moving route and to clean the obstacles.

For the second type and the third type of obstacles, position information of the obstacle may be obtained based on the obstacle distance information. Steering distance information, steering direction information and steering angle information of the autonomous mobile device may be determined by the device controller, so as to re-plan the moving route, i.e., planning an obstacle avoidance route. Then the autonomous mobile device is controlled to perform obstacle avoidance based on the obstacle avoidance route, so as to avoid the obstacles that cannot be cleaned.

Further, in some embodiments of the present disclosure, the autonomous mobile device may include an alert device, wherein the alert device may be connected to the device controller, and the device controller may control the alert device to output an alarm by at least one of sounding and lighting. For the second type of obstacle, it may not only avoid the obstacle by re-planning the moving route, but also output a prompt sound through the alert device, so as to alert users to clean the obstacles that cannot be cleaned by the autonomous mobile device in time while avoiding the obstacles.

The present disclosure has been described by the above embodiments. But it should be understood that the above embodiments are only for the purpose of illustration and description, and are not intended to limit the present disclosure to the scope of the described embodiments. In addition, it should be understood by those skilled in the art that the present disclosure is not limited to the above embodiments, and more variations and modifications can be made according to the teaching of the present disclosure, which fall within the scope of protection claimed by the present disclosure. The protection scope of the present disclosure is defined by the appended claims and their equivalent scope.

What is claimed is:

1. A line laser module comprising:
   a module body;
   a first image capturing assembly, provided on the module body and comprising a first camera, at least one laser emitter, a first image processing module, and a first filter, wherein the at least one laser emitter is provided adjacent to the first camera and configured to emit a line laser with a linear projection toward outside of the module body, the first camera is configured to capture a first environment image containing the line laser, the first image processing module is configured to acquire obstacle distance information based on the first environment image, the line laser is infrared line light, the first camera is an infrared camera, and the first filter is configured to allow only infrared light to enter the first camera; and
   a second image capturing assembly, comprising a second camera, a second image processing module, and a second filter, wherein the second camera is configured to capture a second environment image, the second image processing module is configured to acquire obstacle type information based on the second environment image, the second camera is an RGB camera, and the second filter is configured to allow only visible light to enter the second camera, wherein:

the at least one laser emitter comprises two laser emitters, and the first camera and the second camera are provided side by side horizontally between the two laser emitters, so that the first environment image and the second environment image are at least partially overlapped.

2. The line laser module according to claim 1, wherein the first image processing module acquires the obstacle distance information based on triangulation.

3. The line laser module according to claim 1, wherein the first filter is provided on a side of the first camera away from the module body; and the second filter is provided on a side of the second camera away from the module body.

4. The line laser module according to claim 1, wherein the module body comprises a main body, a first end, and a first connection part which is configured to connect the first end to the main body;

one of the at least one laser emitter is provided at the first end; and the first camera and the second camera are provided on the main body.

5. The line laser module according to claim 1, the line laser module further comprising:

a positioning device for docking, provided on the module body and configured to communicate with a charging station.

6. The line laser module according to claim 5, wherein the positioning device for docking comprises an infrared emitter and at least two infrared receiving devices, wherein the infrared emitter is configured to send a first infrared signal to the charging station, and the at least two infrared receiving devices are configured to receive a second infrared signal from the charging station.

7. The line laser module according to claim 1, the line laser module further comprising a primary control unit which is configured to send operation instructions to the first image capturing assembly and the second image capturing assembly, wherein both the first image capturing assembly and the second image capturing assembly are connected with the primary control unit.

8. The line laser module according to claim 7, wherein each of the at least one laser emitter comprises:

a line laser generator, configured to generate the line laser; and a laser driving circuit connected with the primary control unit, wherein the laser driving circuit controls the laser emitter based on the operation instructions sent by the primary control unit.

9. The line laser module according to claim 8, wherein the laser driving circuit comprises:

a first amplification circuit, configured to receive a control signal sent by the primary control unit, amplify the control signal and send the amplified control signal to the laser emitter, so as to control the laser emitter to turn on or turn off; and a second amplification circuit, configured to receive an adjustment signal sent by the primary control unit, amplify the adjustment signal and send the amplified adjustment signal to the laser emitter, so as to control emission power of the laser emitter.

10. The line laser module according to claim 1, wherein a first optical axis of the first camera is inclined downward with respect to a horizontal direction, and a second optical axis of the second camera is inclined upward with respect to the horizontal direction.

11. The line laser module according to claim 10, wherein a first angle between the first optical axis of the first camera and the horizontal direction is 7 degrees, and a second angle between the second optical axis of the second camera and the horizontal direction is 5 degrees.

12. An autonomous mobile device, comprising:

a device body;

the line laser module according to claim 1, provided on the device body; and a device controller, configured to control movement of the autonomous mobile device based on the obstacle distance information and the obstacle type information.

13. The autonomous mobile device according to claim 12, the autonomous mobile device further comprising:

a buffer component, provided on sides of the first image capturing assembly and the second image capturing assembly away from the device body, and having an opening opposite to the first image capturing assembly and the second image capturing assembly respectively;

wherein the buffer component is provided with a supplement lamp located at periphery of the opening.

14. The line laser module according to claim 1, wherein the second image processing module comprises:

a feature extraction module, configured to perform a feature extraction on the second environment image to obtain feature information; and an identification module, configured to input the feature information into an obstacle identification model to identify the obstacle type information.

15. The line laser module according to claim 14, wherein the second image processing module further comprises:

a training module, configured to generate the obstacle identification model through collected training data.

* * * * *